(12) United States Patent
Rehman

(10) Patent No.: US 7,387,666 B2
(45) Date of Patent: Jun. 17, 2008

(54) BLACK INK-JET INKS

(75) Inventor: Zia Rehman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 152 days.

(21) Appl. No.: 10/603,394

(22) Filed: Jun. 24, 2003

(65) Prior Publication Data

US 2004/0261658 A1 Dec. 30, 2004

(51) Int. Cl.
*C09D 11/02* (2006.01)
*B41J 2/01* (2006.01)

(52) U.S. Cl. .............. 106/31.43; 106/31.58; 106/31.59; 106/31.75; 106/31.86; 106/31.89; 347/100

(58) Field of Classification Search .............. 106/31.43, 106/31.58, 31.59, 31.75, 31.86, 31.89; 347/100
See application file for complete search history.

(56) References Cited

U.S. PATENT DOCUMENTS

| | | | | |
|---|---|---|---|---|
| 5,106,416 A | * | 4/1992 | Moffatt et al. | 106/31.43 |
| 5,462,590 A | | 10/1995 | Yui et al. | |
| 5,507,865 A | * | 4/1996 | Yoshida et al. | 106/31.43 |
| 5,679,143 A | * | 10/1997 | Looman | 106/31.43 |
| 5,736,606 A | | 4/1998 | Yanagi et al. | |
| 6,039,793 A | | 3/2000 | Gundlach et al. | |
| 6,075,131 A | | 6/2000 | Tallant et al. | |
| 6,572,690 B2 | * | 6/2003 | Rehman et al. | 106/31.58 |
| 2002/0162481 A1 | * | 11/2002 | Rehman et al. | 106/31.58 |
| 2004/0070654 A1 | * | 4/2004 | Taguchi et al. | 347/100 |
| 2004/0134381 A1 | * | 7/2004 | Taguchi et al. | 106/31.43 |
| 2005/0126434 A1 | * | 6/2005 | Feldkamp | 106/31.43 |

FOREIGN PATENT DOCUMENTS

| | | |
|---|---|---|
| DE | 10022371 | 11/2000 |
| EP | 0509688 | 10/1992 |
| EP | 0659852 | 6/1995 |
| JP | 2001139854 | 5/2001 |
| JP | 2001187854 | 7/2001 |
| JP | 2002-338860 | 11/2002 |

* cited by examiner

*Primary Examiner*—Helene Klemanski

(57) ABSTRACT

The present invention is drawn toward a black ink-jet ink, comprising a liquid vehicle and a black colorant solubilized or dispersed in the liquid vehicle. The liquid vehicle can include water, a cosolvent, a solubilized naturally occurring amino acid, and an amphoteric surfactant. Other components can optionally be present as well.

24 Claims, No Drawings

BLACK INK-JET INKS

FIELD OF THE INVENTION

The present invention relates generally to ink-jet ink compositions. More particularly, the present invention relates to black ink-jet ink compositions.

BACKGROUND OF THE INVENTION

Computer printer technology has evolved to a point where very high-resolution images can be transferred to various types of media, including paper. Ink-jet printing involves the placement of small drops of a fluid ink onto a media surface in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit and drop-on-demand ink deposit. Regarding drop-on-demand printing systems, the ink-jet inks are typically based upon water and water soluble organic solvents. Essentially, with these systems, ink droplets are propelled from a nozzle by heat or by a pressure wave such that essentially all of the ink droplets ejected are used to form the printed image.

In general, ink-jet inks are either dye- or pigment-based inks. Both are typically prepared in an ink vehicle that contains the dye and/or the pigment. Dye-based ink-jet inks generally use a liquid colorant that is usually water-based to turn the media a specific color. Conversely, pigmented inks typically use a solid or dispersed colorant to achieve color.

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. However, though there has been great improvement in ink-jet printing, accompanying this improvement are increased demands by consumers in this area, e.g., higher speeds, higher resolution, full color image formation, increased stability, etc. As new ink-jet inks are developed, there have been several traditional characteristics to consider when evaluating the ink in conjunction with a printing surface or substrate. Such characteristics include edge acuity and optical density of the image on the surface, black to color bleed control, dry time of the ink on the substrate, adhesion to the substrate, lack of deviation in ink droplet placement, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

One characteristic of many ink-jet inks that can be modified to provide improved image quality, particularly with respect to black ink-jet inks, is optical density. As such, investigations continue into developing black ink-jet ink formulations that have improved optical density, and which achieves this improvement without significantly compromising another ink-jetting property.

SUMMARY OF THE INVENTION

A black ink-jet ink is provided that can include a liquid vehicle and a black colorant solubilized or dispersed in the liquid vehicle. The liquid vehicle can comprise water, a cosolvent, a solubilized naturally occurring amino acid, and an amphoteric surfactant.

In another embodiment, a method of generating a black image on uncoated paper can comprise the steps of formulating an inkjet ink including a liquid vehicle and a black colorant solubilized or dispersed in the liquid vehicle, and ink-jetting the ink-jet ink onto an uncoated paper. The liquid vehicle for use with the method can comprise water, a cosolvent, a solubilized naturally occurring amino acid, and an amphoteric surfactant.

Additional features and advantages of the invention will be apparent from the detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. In accordance with embodiments of the present invention, the term "liquid vehicle" also includes solubilized naturally occurring amino acids and amphoteric surfactants.

As used herein, "colored," when referring to ink-jet inks, refers to non-black ink-jet ink compositions. For example, typical colored ink compositions can be cyan, magenta, yellow, or mixtures thereof. Colored ink-jet inks of the present invention can be either dye or pigment based inks.

As used herein, the term "non-reactive" when referring to an ink set is a combination of a black ink-jet ink in accordance with embodiments of the present invention and colored ink(s), neither of which is reactive with one another.

The term "bleed" refers to a propensity of a first inkjet ink to run into an adjacently printed second ink-jet ink. Low bleed is typically desired with respect to ink-jet ink printing systems.

"Amphoteric surfactants" are surfactants that bear both positive and negative charges. The amphoteric properties can be related to the pH of the system, and can behave more like anionics (an agent in which the active molecule bears a negative electric charge) or cationics (an agent which possesses a positive electrical charge), depending on the pH. Within certain pH ranges, both a positive and a negative charge can be present simultaneously.

The term "naturally occurring amino acid" includes the twenty or so amino acids derived from proteins. When referring to such amino acids as "solubilized," what is meant is that the amino acid is at least partially solubilized to become part of the liquid vehicle composition.

The term "colorant" includes both dyes and pigments.

The term "uncoated paper" shall mean that the paper is not coated with a swellable polymeric coating, e.g., gelatin, or an inorganic porous coating, e.g., silica. This is not to say that the paper cannot be coated with any substance, as many paper-making processes include coatings of various types. Stated another way, the term "uncoated paper" is meant primarily to exclude photographic media and the like.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, a black ink-jet ink composition can comprise a liquid vehicle and a black colorant solubilized or dispersed in the liquid vehicle. The liquid vehicle can include water, a cosolvent, a naturally occurring amino acid, and an amphoteric surfactant.

In another embodiment, a method of generating a black image on uncoated paper can comprise steps of formulating an ink-jet ink including a liquid vehicle and a black dye solubilized or dispersed in the liquid vehicle, and ink-jetting the ink-jet ink onto an uncoated paper. As with the composition described above, the liquid vehicle can comprise water, a cosolvent, a naturally occurring amino acid, and an amphoteric surfactant. In one embodiment, the dye, the naturally occurring amino acid, and the amphoteric surfactant can be configured to work synergistically to reduce ink-jet ink penetration into the paper.

Maintaining good optical density with black inks, particularly black dye-based ink-jet inks, can be a challenge. Typically, anionic surfactants and other non-amphoteric surfactants are often used to control bleed in non-reactive printing systems. However, surfactants cause dye-based black ink-jet inks to penetrate plain and uncoated papers, thereby affecting optical density negatively. By combining amino acids with amphoteric surfactants in a liquid vehicle, black ink-jet inks prepared therefrom can have good optical density due to decreased plain paper penetration of the ink-jet ink.

Amino acids have multiple sites or moieties that can behave differently from one another, i.e., one as an acid and another as a base, although the molecule as a whole can be more neutral (depending on the pH of the system). This duality of function allows for multiple configurations within an ink-jet ink such that dyes can become more fully dispersed within the ink-jet ink. The naturally occurring amino acid that can be used can be selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine, valine, dipeptides, tripeptides, tetrapeptides, and combinations thereof. In one embodiment, the amino acid can be solubilized to become part of the liquid vehicle at from 0.1 wt % to 10 wt %.

In addition to the amino acid, an amphoteric surfactant can be present. It is believed that the presence of the amphoteric surfactant can aid in alleviating bleed between a black inkjet ink of the present invention and a colored ink-jet ink that is non-reactive with the black ink-jet ink. The amphoteric surfactant can be any functional amphoteric surfactant, including those selected from the group consisting of alkyl betaines, alkyl amidopropyl betaines, cocobetaines, cocoamidopropyl betaines, hydroxysulfo betaines, cocohydroxysulfo betaines, cocoamphodipropionates, cocoamphopropionates, sulfobetaines, alkyl amine dicarboxylates, polyglycol ether derivatives, N-alkyl glycinates, N-cocobetaine aminobutyric acids, lecithins and enzyme modified lecithins, hydroxylated lecithins, soy phosphatides, oleyl betaines, lauryl dimethyl amine oxides, alkylimino-dipropionates, alkylampho-propionates, cocoamphodiacetates, cocoamphodiacetates, alkylirmino-dipropionates, alkylamphodipropionates, alkylamphodiacetates, and combinations thereof. In one embodiment, the amphoteric surfactant can also be present as part of the liquid vehicle at from 0.01 wt % to 2 wt %.

The black colorant can be a dye and/or a pigment colorant. In one embodiment, the black colorant can be a dye selected from the group consisting of pacified Reactive Black 31, Direct Black 168, Acid Black 52, Direct Black 170, Direct Black 22, Direct Black 19, Reactive Black 8, Solvent Black 13, Food Black 2, copper complexed azo black (such as available from Ilford), and combinations thereof. Typically, the black dye can be present in the ink-jet ink at from 0.1 wt % to 10 wt %. If a black pigment is used, such as a carbon black pigment, the pigment can be present in the liquid vehicle at from 0.1 wt % to 8 wt % by solids.

Other properties that are desired for the black ink jet ink compositions include neutral black color, neutral gray scale, and good optical density. Good optical density, or fullness and intensity of color, is desired in order to produce images, which are full in tone and not washed out. Further, as optical density range increases, so does the ability to produce sharp transitions between different shades of black. The shades of black, ranging from black to white, are known as gray scale. Generally, black inks that display a higher optical density are capable of producing a greater number of transitory gray shades between black and white, and therefore produce higher quality images. Compositions of the present invention can be prepared such that improved neutral black and gray scale, as well as improved optical density are achievable.

As mentioned, the ink-jet ink compositions of the present invention are typically prepared in an aqueous formulation or liquid vehicle which can include water, cosolvents, surfactants, buffering agents, biocides, sequestering agents, viscosity modifiers, humectants, binders, and/or other known additives. Also included are one or more of the amino acids and amphoteric surfactants described previously. Typically the ink-jet ink compositions of the present invention have a viscosity of between about 0.8 to about 8 cps. In one aspect of the present invention, the liquid vehicle can comprise from about 70 wt % to about 99.9 wt % by weight of the ink-jet ink composition. In another aspect, other than the colorant, liquid vehicle can also carry polymeric binders, latex particulates, and/or other solids.

As described, cosolvents can be included in the ink-jet ink compositions of the present invention. Suitable cosolvents for use in the present invention include water soluble organic cosolvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons-or less, ethylene glycol alkyl ethers, propylene glycol alkyl ethers, poly(ethylene glycol)alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 1-(2-hydroxyethyl)-2-pyrrolidinone, 2-ethyl-2-hydroxymethyl-1,3-propanediol, diethylene glycol, 3-methoxybutanol, and 1,3-dimethyl-2-imidazolidinone, 1,2-hexanediol, 1,2-octanediol, 2,5-dimethyl-3-hexyne-2,5-diol, trimethylol propane, 3-hexyne-2, 5-diol, sulfolane, and 3-pyridyl carbinol and other pyridine derivatives. Cosolvents can be added to reduce the rate of evaporation of water in the ink-jet ink in order to minimize clogging or alter other properties of the ink such as viscosity, pH, surface tension, optical density, and print quality. The cosolvent concentration can range from about 0.5 wt % to about 20 wt %, and in one embodiment is from about 2 wt % to about 10 wt %. Multiple cosolvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

pH modification can be carried out such that the amphoteric surfactant, and optionally the amino acid, is in a zwitterionic state. Typically, pH balancing can occur such that the formulated ink-jet ink composition has a pH from about 6 to 8. In one embodiment, the pH can be about 7. In other embodiments, the ink-jet ink can include an acid to lower the pH to from 8 to 6, and in another embodiment, the ink-jet ink can include a base to raise the pH to from 6 to 8. However, these ranges are not considered to be the only workable ranges, as some amino acids and amphoteric surfactants can be functional for use at other pH levels, as would be known by those skilled in the art after considering the present invention.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

In an additional aspect of the present invention, binders can be included which can act to secure colorants on a substrate. Binders suitable for use in the present invention typically have a molecular weight of from about 200 Mw to about 8000 Mw. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and combinations and salts thereof.

If additional surfactant is used, other than the amphoteric surfactant, then typical water-soluble surfactants such as alkyl polyethylene oxides, alkyl phenyl polyethylene oxides, polyethylene oxide (PEO) block copolymers, acetylenic PEO, PEO esters, PEO amines, PEO amides, dimethicone copolyols, and primary and secondary alchohols can be used. If used, non-amphoteric surfactants can be present at from 0.01% to about 10% by weight of the ink-jet ink composition.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

Preparation of Ink-jet Inks for OD Analysis

Two zwitterionic surfactant-containing black ink-jet inks were prepared, one with an amino acid present and one without. Additionally, a different amount of acid (HCl) was used in each ink-jet ink so that the pH of each ink was approximately the same. Specifically, the inks were prepared according to Table 1 as follows:

TABLE 1

| Ingredient | Ink 1 | Ink 2 |
|---|---|---|
| black dye | 5.5 wt % | 5.5 wt % |
| Substituted pyridine | 10.0 wt % | 10.0 wt % |
| MOPS | 0.2 wt % | 0.2 wt % |
| 2-pyrrolidinone | 5.0 wt % | 5.0 wt % |
| β-alanine | — | 4.0 wt % |
| cocobetaine (ULS 35% active) | 0.18 wt % | 0.18 wt % |
| Dodecanol | 0.06 wt % | 0.06 wt % |
| PROXEL GXL | 0.1 wt % | 0.1 wt % |
| HCl | 0.15 wt % | 0.1 wt % |
| Water | balance | balance |

Example 2

Optical Density Analysis

Inks 1 and 2 from Example 1 were each loaded into individual ink-jet pens and jetted onto 15 different types of paper. Each printed image was allowed to dry and was tested for optical density. On average, the optical density for Ink 2 (which contained both an amino acid and a zwitterionic surfactant) was better than that of Ink 1 (which did not contain an amino acid). The results are provided in Table 2 as follows:

TABLE 2

| Paper | Ink 1 (OD) | Ink 2 (OD) |
|---|---|---|
| Steinbeis/Zweckform Recyconomic | 0.99 | 1.07 |
| Aussedat Rey-Reymat | 1.16 | 1.18 |
| Stora Papyrus Natura | 1.17 | 1.34 |
| Hewlett-Packard Multipurpose Paper | 1.21 | 1.25 |
| Kymene KymCopy Lux | 1.23 | 1.25 |
| Hokuetsu Kin-Mari | 1.23 | 1.35 |
| Oji Sunace PPC | 1.24 | 1.28 |
| Hewlett-Packard Bright White Paper | 1.24 | 1.42 |
| Neenah Classic Laid | 1.24 | 1.39 |
| Hammermill Fore DP (20#) | 1.25 | 1.22 |
| Stora Papyrus Multicopy | 1.26 | 1.34 |
| Sabah Forest Industries | 1.27 | 1.24 |
| Xerox Multipurpose | 1.27 | 1.26 |
| Union Camp Great White | 1.29 | 1.40 |
| Gilbert Bond | 1.29 | 1.41 |
| Average | 1.22 | 1.29 |

Example 3

Preparation of Ink-jet Inks for Bleed Control Analysis

An ink-jet ink was prepared according to Table 3 as follows:

TABLE 3

| Ingredient | Ink 3 |
|---|---|
| black dye | 5.5 wt % |
| 1,2-hexanediol | 4.0 wt % |
| Substituted pyridine | 10.0 wt % |
| MOPS | 0.2 wt % |
| 2-pyrrolidinone | 5.0 wt % |
| PROXEL GXL | 0.1 wt % |
| TERGITOL 15 S-12 | 3.0 wt % |
| cocobetaine (ULS 35% active) | 0.18 wt % |
| HCl | 0.12 wt % |
| water | balance |

Ink 3 was prepared and divided into nine equal samples (A-I). Sample A remained unaltered as prepared in Table 3. To each samples B, C, D, E, F, G, H, and I was added 4 wt % of eight different amino acids, respectively. The eight amino acids that were added were arginine to sample B, β-alanine to sample C, 10 glutamine to sample D, asparagine to sample E, histidine to sample F, glycine to sample G, proline to sample H, and lysine to sample I.

Example 4

Bleed Control Analysis

Each of sample A-I, prepared as in Example 3, were loaded into nine separate ink-jet pens, and each pen was used to print 1 mm lines on two types of paper (HP Printing Paper and PH Bright White Paper). Additionally, similar lines were reprinted on the same two types of paper, the only difference being that the second set of lines was printed in contact with a yellow ink-jet ink that was substantially non-reactive with respect to the nine black ink-jet ink samples. The amount of bleed was determined according to delta width data. In particular, delta width was determined by measuring the increase in line width when printed against the yellow ink-jet ink compared to the line width when printed alone. Numbers closer to 0 indicated less bleed. The data collected is set forth in Table 4 below:

TABLE 4

| Ink | HP Bright White Paper (delta width) | HP Printing Paper (delta width) |
|---|---|---|
| A | 0.5 | 0.3 |
| B | 0.4 | 0 |
| C | 0.6 | 0.4 |
| D | 0.4 | 0.4 |
| E | 0.7 | 0.1 |
| F | 0.4 | 0.1 |
| G | 0.3 | 0.1 |
| H | 0.2 | 0.1 |
| I | 0.4 | 0.2 |

As can be seen by Table 4 above, Inks B, F, G, H, and I had better delta width properties than Ink A. Inks D and E each performed better on one of the two type of paper, as compared to control Ink A. Only Ink C performed slightly worse on both types of paper, as compared to Ink A. However, the difference between Ink A and Ink C was substantially the same when viewed by the naked eye. As a further note, with proper pH optimization, the bleed performance for all these inks, particularly inks B through I, can be further improved.

The inks prepared and analysis performed in accordance with Examples 1-4 above demonstrates that, generally, optical density can be improved, and generally, bleed can be substantially unaffected or slightly improved by the presence of a zwitterionic surfactant and an amino acid in an ink-jet ink, in accordance with principles of the present invention.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A black ink-jet ink, comprising:
   a) a liquid vehicle, including:
      i) water,
      ii) a cosolvent,
      iii) a solubilized naturally occurring amino acid in a zwitterionic state, and
      iv) from 0.01 wt % to 2 wt % of an amphoteric surfactant in a zwitterionic state; and
   b) a black colorant solubilized or dispersed in the liquid vehicle,
   such that the black ink-jet ink has improved optical density on bright white paper or improved bleed control when printed against a non-reactive color-ink-jet ink on bright white paper, both when compared to a similar black ink-jet ink being identical to the black ink-jet ink except that it is devoid of the naturally occurring amino acid in favor of added water.

2. A black ink-jet ink as in claim 1, wherein the naturally occurring amino acid is selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threorine, tryplophan, tyrosine, valine, dipeptides, tripeptides, tetrapeptides, and combinations thereof.

3. A black ink-jet ink as in claim 1, wherein the naturally occurring amino acid is present in the liquid vehicle at from 0.1 wt % to 10 wt %.

4. A black ink-jet ink as in claim 1, wherein the amphoteric surfactant is selected from the group consisting of alkyl betaines, alkyl amidopropyl betaines, cocobetaines, cocoamidopropyl betaines, hydroxysulfo betaines, cocohydroxysulfo betaines, cocoamphodipropionates, cocoamphopropionates, sulfobetaines, alkyl amine dicarboxylates, polyglycol ether derivatives, N-alkyl glycinates, N-cocobetaine aminobutyric acids, lecithins and enzyme modified lecithins, hydroxylated lecithins, soy phosphatides, olcyl betaines, lauryl dimethyl amine oxides, alkylimino-dipropionates, alkylampho-propionates, cocoamphodiacetates, alkyliminodipropionates, alkylamphodipropionates, alkylamphodiacetates, and combinations thereof.

5. A black ink-jet ink as in claim 1, wherein the black colorant is a dye selected from the group consisting of pacified Reactive Black 31, Direct Black 168, Acid Black 52, Direct Black 170, Direct Black 22, Direct Black 19, Reactive Black 8, Solvent Black 13, Food Black 2, copper complexed azo black, and combinations thereof.

6. A black ink-jet ink as in claim 1, wherein the black dye is present in the ink-jet ink at from 0.1 wt % to 10 wt %.

7. A black ink-jet ink as in claim 1, wherein the ink-jet ink has a pH from 6 to 8.

8. A black ink-jet ink as in claim 7, wherein the ink-jet ink has a pH of about 7.

9. A black ink-jet ink as in claim 7, wherein the ink-jet ink includes an acid to lower the pH to from 8 to 6.

10. A black ink-jet ink as in claim 7, wherein the ink-jet ink includes a base to raise the pH to from 6 to 8.

11. A black ink-jet ink as in claim 1, said ink-jet ink being free of reactive agents, such that the ink-jet ink is nonreactive.

12. A method of generating an image on uncoated paper, comprising:
(a) formulating a black ink-jet ink including a liquid vehicle and a black colorant solubilized or dispersed in the liquid vehicle, said liquid vehicle including:
  i) water,
  ii) a cosolvent;
  iii) a solubilized naturally occurring amino acid in a zwitterionic state; and
  iv) from 0.01 wt % to 2 wt % of an amphoteric surfactant in a zwitterionic state; and
(b) ink-jetting the black ink-jet ink onto an uncoated paper, such that the black ink-jet ink has improved optical density on bright white paper or improved bleed control when printed against a non-reactive color-ink-jet ink on bright white paper, both when compared to a similar black ink-jet ink being identical to the black ink-jet ink except that it is devoid of the naturally occurring amino acid in favor of added water.

13. A method as in claim 12, wherein the colorant, the naturally occurring amino acid, and the amphoteric surfactant work synergistically to reduce the black ink-jet ink penetration into the paper.

14. A method as in claim 12, wherein the naturally occurring amino acid is selected from the group consisting of alanine, arginine, asparagine, aspartic acid, cysteine, cystine, glutumine, glutamic acid, glycine, histidine, hydroxyproline, isoleucine, leucine, lysine, methionine, ornithine, phenylalanine, proline, serine, threonine, tryptophan, lyrosine, valine, amino acid dipeptides, amino acid tripeptides, amino acid tetrapeptides, and combinations thereof.

15. A meihod as in claim 12, wherein the naturally occurring amino acid is present in the liquid vehicle at from 0.1 wt % to 10 wt %.

16. A method as in claim 12, wherein the amphoteric surfactant is selected from the group consisting of alkyl betaines, alkyl amidopropyl betaines, cocobetaines, cocoamidopropyl betaines, hydroxysulfo betaines, cocohydroxysulfo betaines, cocoamphodipropionates, cocoamphopropionates, sulfobetaines, alkyl amino dicarboxylates, polyglycol ether derivativcs, N-alkyl glycinates, N-cocobetaine aminobutyric acids, lecithins and enzymc modified lecithins, hydroxylated lecithins, soy phosphatides, oleyl betaines, lauryl dimethyl amino oxides, alkylimino-dipropionates, alkylampho-propionates, cocoamphodiacetates, alkyliminodipropionates, alkylamphopropionates, alkylamphodiacetates, and combinations thereof.

17. A method as in claim 12, wherein the black colorant is a black dye selected from the group consisting of pacified Reactive Black 31, Dircet Black 168. Acid Black 52, Direct Black 170, Direct Black 22, Direct Black 19, Reactive Black 8. Solvent Black 13, Food Black 2, copper complexed azo black, and combinations thereof.

18. A method as in claim 17, wherein the black dye is present in the black ink-jet ink at from 0.1 wt % to 10 wt %.

19. A method as in claim 12, wherein the black ink-jet ink has pH from 6 to 8.

20. A method as in claim 12, further comprising thc step of ink-jetting a colored ink-jet ink onto the uncoated paper such that a border of the colored ink-jet ink contacts a border of the black ink-jet ink, and wherein the colored ink-jet ink and the black ink-jet ink are non-reactive with respect to one another.

21. A black ink-jet ink as in claim 1, wherein the black ink-jet ink has improved optical density on bright white paper when compared to a second black ink-jet ink, said second black ink-jet ink being devoid of the naturally occurring amino in favor of added water which is otherwise identical to the black ink-jet ink.

22. A black ink-jet ink as in claim 1, wherein the black ink-jet ink has improved bleed control when printed against a non-reactive color ink-jet ink on bright white paper when compared to a second black ink-jet ink, said second black ink-jet ink being devoid of the naturally occurring amino in favor of added water which is otherwise identical to the black ink-jet ink.

23. A method as in claim 12, wherein the black ink-jet ink has improved optical density on bright white paper when compared to a second black ink-jet ink, said second black ink-jet ink being devoid of the naturally occurring amino in favor of added water which is otherwise identical to the black ink-jet ink.

24. A method as in claim 12, wherein the black ink-jet ink has improved bleed control when printed against a non-reactive color ink-jet ink on bright white paper when compared to a second black ink-jet ink, said second black ink-jet ink being devoid of the naturally occurring amino in favor of added water which is otherwise identical to the black ink-jet ink.

* * * * *

UNITED STATES PATENT AND TRADEMARK OFFICE
CERTIFICATE OF CORRECTION

PATENT NO. : 7,387,666 B2
APPLICATION NO. : 10/603394
DATED : June 17, 2008
INVENTOR(S) : Zia Rehman It is certified that error appears in the above-identified patent and that said Letters Patent is hereby corrected as shown below:

In column 4, lines 20-21, delete "alkylirminodipropionates" and insert -- alkyliminodipropionates --, therefor.

In column 7, line 57, delete "10" before "glutamine".

In column 9, line 6, in Claim 2, delete "threorine, tryplophan," and insert -- threonine, tryptophan, --, therefor.

In column 9, line 20, in Claim 4, delete "olcyl" and insert -- oleyl --, therefor.

In column 9, line 42, in Claim 11, delete "nonreactive" and insert -- non-reactive --, therefor.

In column 10, line 4, in Claim 14, delete "glutumine" and insert -- glutamine --, therefor.

In column 10, line 6, in Claim 14, delete "lyrosine" and insert -- tyrosine --, therefor.

In column 10, line 9, in Claim 15, delete "meihod" and insert -- method --, therefor.

In column 10, line 17, in Claim 16, delete "alkyl amino" and insert -- alkyl amine --, therefor.

In column 10, lines 17-18, in Claim 16, delete "derivativcs" and insert -- derivatives --, therefor.

In column 10, line 19, in Claim 16, delete "enzymc" and insert -- enzyme --, therefor.

In column 10, line 20, in Claim 16, delete "lauryl dimethyl amino" and insert -- lauryl dimethyl amine --, therefor.

In column 10, lines 22-23, in Claim 16, delete "alkylamphopropionates" and insert -- alkylamphodipropionates --, therefor.

Signed and Sealed this

Twenty-eighth Day of September, 2010

David J. Kappos
*Director of the United States Patent and Trademark Office*

CERTIFICATE OF CORRECTION (continued)
U.S. Pat. No. 7,387,666 B2

In column 10, line 27, in Claim 17, delete "Dircet Black 168." and insert -- Direct Black 168, --, therefor.

In column 10, line 29, in Claim 17, before "Solvent" delete "." and insert -- , --, therefor.

In column 10, line 34, in Claim 19, after "has" insert -- a --.

In column 10, line 35, in Claim 20, after "comprising" delete "thc" and insert -- the --, therefor.